United States Patent [19]

Hamasaki et al.

[11] 4,090,245

[45] May 16, 1978

[54] EFFECTIVE DIGIT CAPACITY MODIFICATION MEANS FOR INTEGRATED CIRCUIT CALCULATORS

[75] Inventors: Iwao Hamasaki, Miyazaki; Koji Maekawa, Yamatokoriyama, both of Japan

[73] Assignee: Sharp Kabushiki Kaisha, Osaka, Japan

[21] Appl. No.: 709,374

[22] Filed: Jul. 28, 1976

[30] Foreign Application Priority Data

Jul. 31, 1975 Japan .................................. 50-94343

[51] Int. Cl.² ............................................. G06F 1/00
[52] U.S. Cl. ..................................... 364/712; 364/900
[58] Field of Search ............................. 235/152, 156; 340/172.5; 307/221 R, 265; 328/37, 111

[56] References Cited

U.S. PATENT DOCUMENTS

| | | | |
|---|---|---|---|
| 3,454,750 | 7/1969 | Shimabukuro | 235/176 X |
| 3,483,526 | 12/1969 | Couleur | 340/172.5 |
| 3,569,685 | 3/1971 | Chesley | 235/156 |
| 3,739,352 | 6/1973 | Packard | 340/172.5 |

Primary Examiner—Jerry Smith
Attorney, Agent, or Firm—Birch, Stewart, Kolasch & Birch

[57] ABSTRACT

A large scale integrated circuit central processing unit for calculator applications generally includes at least one information storage register and means for generating a word time signal designating the effective digit capacity of the information storage register. An additional external terminal is provided for the package of the integrated circuit to accept control signals applied thereto which are effective to modify the pulse width of the word time signal. Application of the control signals to the external terminal renders the word time signal generating means operative to enable the modification in the pulse width of the word time signal and hence in the effective digit capacity of the storage register.

6 Claims, 4 Drawing Figures

EFFECTIVE DIGIT CAPACITY MODIFICATION MEANS FOR INTEGRATED CIRCUIT CALCULATORS

BACKGROUND OF THE INVENTION

The present invention relates to an integrated circuit wherein the effective digit capacity of an information storage register contained therein is selectable or variable under control of control signals applied thereto.

Generally, recent large scale integrated circuits or LSIs for calculator purposes are of the combined read-only-memory (or ROM) and shift register type. If it is desired to modify the specifications of such types of LSIs, all that is necessary is to modify only ROM regions, thereby ensuring a high degree of versatility. In other words, the modifications in the LSIs specifications can be accomplished easily by controlling the thickness of a layer of $SiO_2$ in the ROM regions without any variations in the basic layouts of the LSIs.

Nevertheless, particularly when the digit storage capacity of the shift registers should be changed, it is sometimes required to modify the layout of the LSIs. In this instance, even if allowances are previously provided for the digit capacity of the shift registers, a program sequence for the digit capacity modification should be assembled into the ROM regions. This results in a decline in the utilization efficiency of the ROM regions. These limitations on manufacture due to digit capacity modifications cause cost increases since cost reduction of LSIs is predicated largely upon mass production.

SUMMARY OF THE INVENTION

Accordingly, it is an object of the present invention to provide an improved integrated circuit which contains one or more shift registers of easily selectable or variable length to provide versatility even at low-cost manufacture.

In order to achieve this object, the improved integrated circuit of the present invention is provided with an additional external terminal for digit capacity modification purposes. In addition, in accordance with the present invention, the improved integrated circuit is provided with means responsive to control signals applied to the external terminal to control word time signal generating means contained therein in a manner to change the pulse width of a word time signal. The word time signal is controlled with respect to its pulse width without any change in its pulse period. The integrated circuit of the present invention is further provided with means for defining the pulse width of microinstructions in agreement with the pulse width of the word time signal, whereby an arithmetic logic unit contained therein becomes operable for shift registers of different lengths.

BRIEF DESCRIPTION OF THE DRAWING

A better understanding of the present invention may be had from a consideration of the following detailed description taken in conjunction with the accompanying drawings in which.

DETAILED DESCRIPTION OF THE INVENTION

Figure 1:
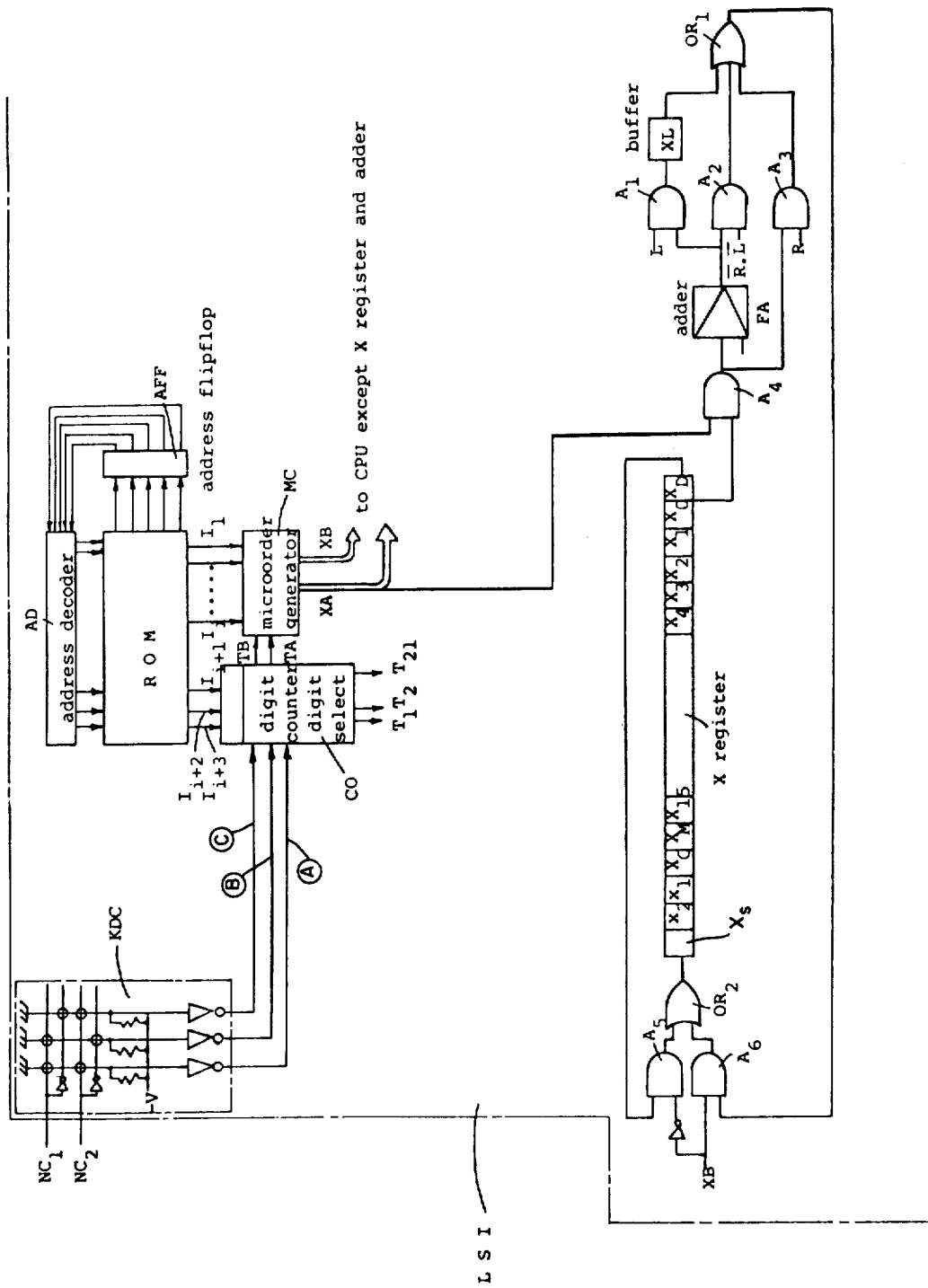
FIG. 1 is a schematic block diagram of an integrated circuit constructed in accordance with the present invention.

Referring now to FIG. 1, there is illustrated one preferred form of the present invention wherein an electronic calculator system is implemented in an MOS/LSI semiconductor chip with selectable digit capacity, for example, sixteen digits, fourteen digits or twelve digits. As set forth briefly in the foregoing paragraph, the LSI chip primarily includes a read-only-memory region and a shift register region. The first named region includes a read-only-memory ROM for arithmetic control, an address decoder AD and a sequence of address flip flops AFF and supplies a string of arithmetic instructions $I_1 - I_i$, $I_{i+2}$ and $I_{i+3}$ for a micro program generator MC and a timing counter CO to be hereinafter more fully described.

The second region contains one or more arithmetic registers X of which a major portion $X_0 - X_{15}$ is adapted for the storage of numeral information. As well known in the art, the register X includes additional segments, that is, $X_M$ for the storage of the most significant digit, Xc for the determination as to whether overflows and so forth are developed, $x_1$ and $x_2$ for the storage of decimal point information, $X_s$ for the storage of signs, etc., and $X_D$ for shift timing. An adder/subtractor FA is associatively provided. A four-bit shift register $X_L$ is provided for left shifting purposes such that it establishes a left shift loop of $X_0 \rightarrow A_4 \rightarrow FA \rightarrow A_1 \rightarrow X_L \rightarrow OR_1 \rightarrow A_6 \rightarrow OR_2 \rightarrow X_S$ upon receipt of left shift control signals L. An AND gate $A_2$ is provided for recirculating the contents of the register X via the adder/subtractor FA. An AND gate $A_3$ is responsive to right shift control signals R to establish a right shift loop for the contents of the register X. An AND gate $A_4$ is under control of control signals XA of a pulse width corresponding to the desired effective digit capacity and thus controls transmission of the contents of the register X. An AND gate $A_5$ is provided for merely recirculating and holding the contents of the register X. An AND gate $A_6$ is provided for restoring the contents of the register X derived via the AND gate $A_4$ to the original positions X. Control signals XB are one-digit time delayed with respect to the control signal XA.

An important-feature of the present invention is the inclusion of additional external terminals $NC_1$ and $NC_2$ of the large scale integrated circuit chip LSI. The terminals $NC_1$ and $NC_2$ are ones that serve the purposes of controlling or switching the pulse width of word time signals and thus are held at either one of negative voltage (V) or ground voltage (OV). Inputs to the terminals $NC_1$ and $NC_2$ are decoded through a switching decoder KDC to produce switching signals Ⓐ, Ⓑ and Ⓒ. These switching signals Ⓐ, Ⓑ and Ⓒ are introduced into the timing generator CO to control the same.

Figure 2:
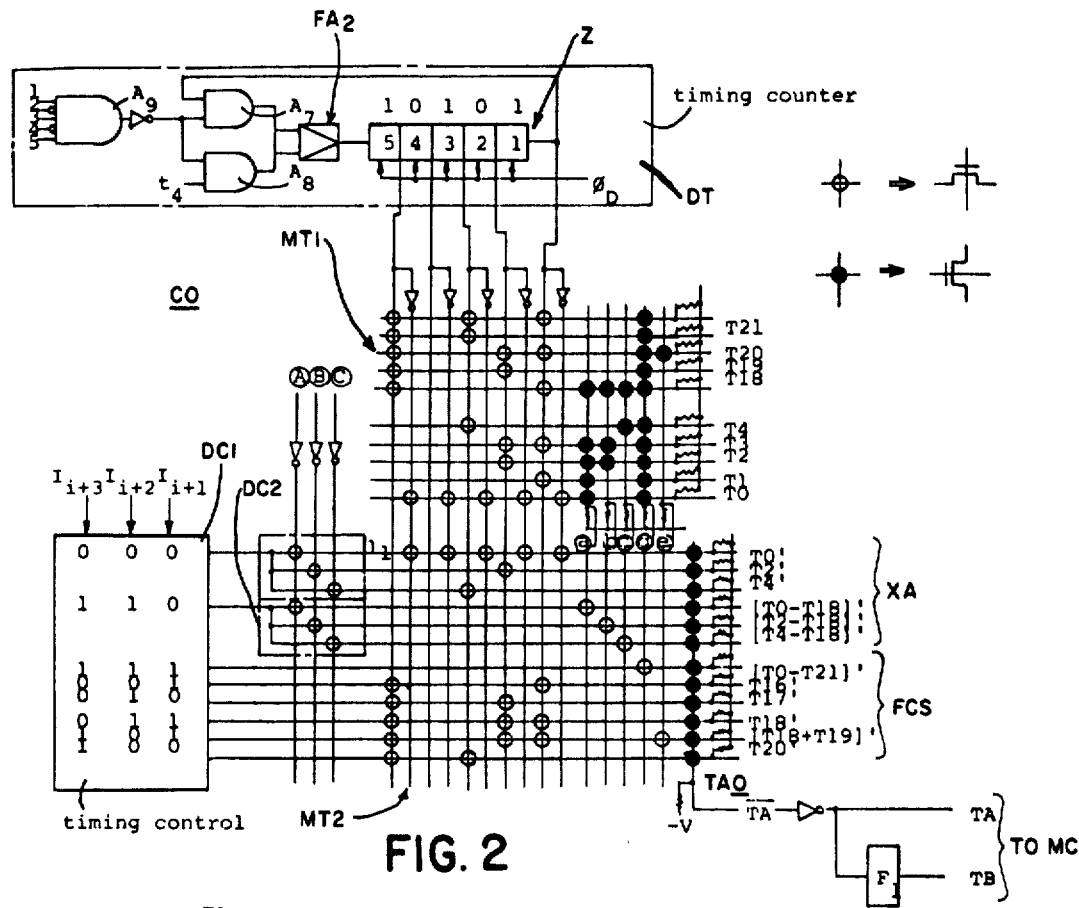
FIG. 2 is a more detailed block diagram of the major portion of the integrated circuit illustrated in FIG. 1.

As viewed from FIG. 2, the timing generator CO consists of a digit time counter DT, a matrix circuit $MT_1$ adapted for delivery digit time signals $\overline{T}_0 - \overline{T}_{21}$ each designating the respective digit positions of the register X, a second matrix circuit $MT_2$ adapted for delivering digit select signals such as word time signals, and a decoder $DC_1$ adapted for designating which one of the digit select signals is selected upon receipt of the arithmetic instructions $I_{i+1} - I_{i+C}$. The above mentioned digit select signals imply, for example, word time pulse $[T_0 - T_{18}]$ or sixteen digit selection, word time pulse $[T_2 - T_{18}]$ for fourteen digit selection, first digit timing signal $T_{16}'$ for numeral information storage, etc.

The digit time counter DT comprises a five-bit register Z and an adder/subtractor $FA_2$ and is incremented, one location at a time. The digit time counter DT is cleared or reset through the use of a gate $A_9$ when the digit locations $Z_5 - Z_1$ assume "10101". The contents of the locations $Z_5 - Z_1$ are supplied via Y lines to the matrix circuits $MT_1$ and $MT_2$. Therefore, the matrix $MT_1$ repeats the generation of the sequence $\overline{T_0 - T_{21}}$. The matrix $MT_2$ produces the select signals in response to the select signals $I_{i+1} - I_{i+3}$ in accordance with developments of arithmetic operations. The digit select signals XA are of two different types, one having the waveform varying in accordance with the effective digit capacity of the register X and the other having the unvaried waveform. The former is as its typical example the word time signals, while the latter is as its typical example the signals $[T_{18} + T_{19}]'$ for the decimal point. The latter is generally called signals FCS.

In FIG. 2, the decoder $DC_2$ further divides the outputs from the decoder $DC_1$ in response to the switching signals Ⓐ, Ⓑ and Ⓒ, the thus divided outputs being entered into the matrix circuit $MT_2$. By the operation of the decoder $DC_2$, the word time pulses are optionally varied with respect to the pulse width.

When the given example of the LSI is desired to be used for sixteen digit capacity calculator, the terminals $NC_1$ and $NC_2$ are placed at $-V$ and thus the signal Ⓐ is produced. For fourteen digit capacity application, the signal Ⓑ is produced and also for twelve digit capacity application the signal Ⓒ is produced.

Figure 4:
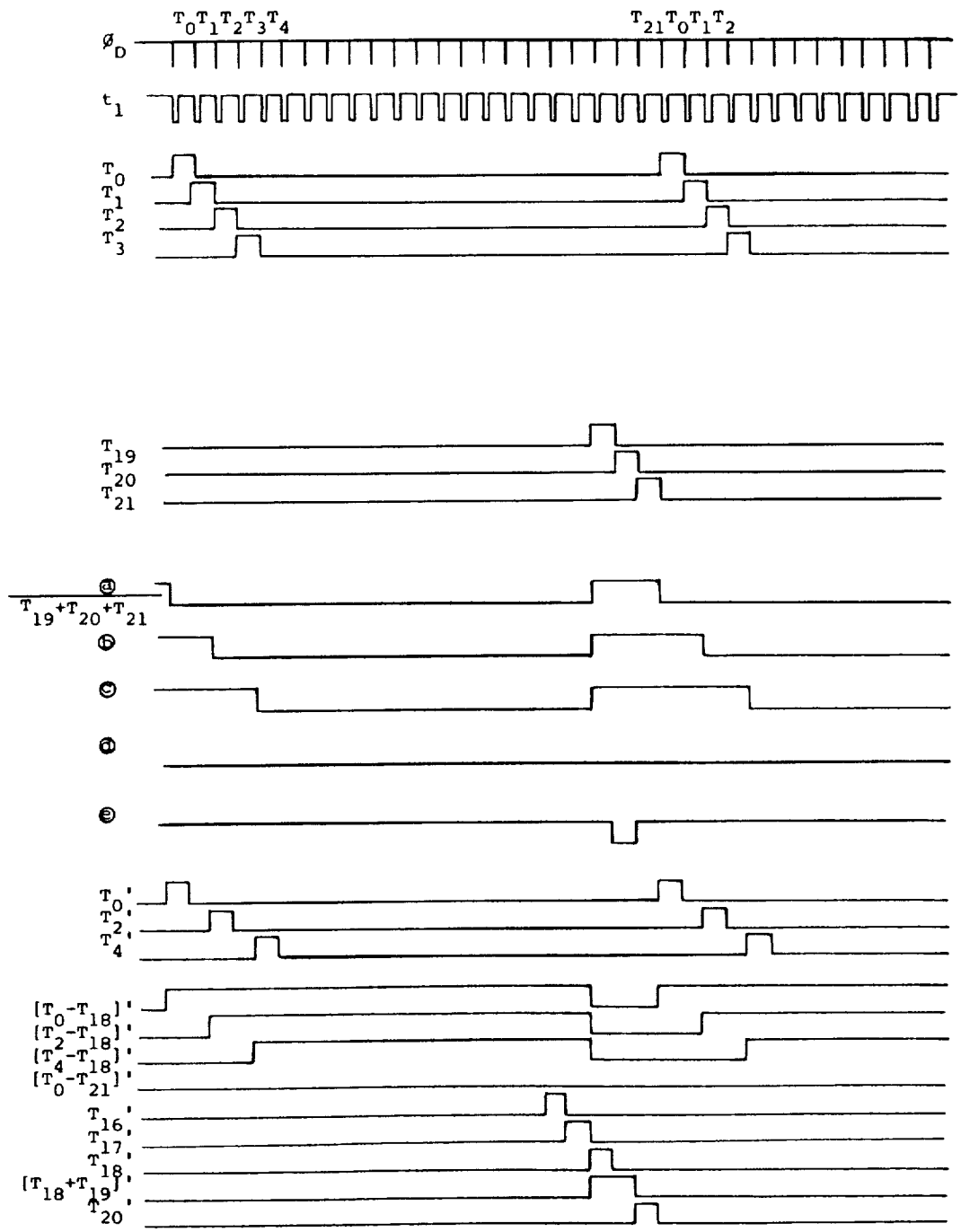
FIG. 4 is a timing diagram of various signals which occur within the integrated circuit of FIG. 1.

The illustrative LSI will be processed in the following manner for sixteen digit calculator application. When the arithmetic instructions $I_{i+1} - I_{i+3}$ are "000", the X line $l_1$ is selected with the generation of the least significant digit timing signal $T_0'$ for sixteen digit application. Also when the instructions $I_{i+1} - I_{i+3}$ are "110", the sixteen digit word time signal $[T_0 - T_{18}]'$ is produced. They develop at a terminal TA$l$. The signal appearing at the terminal TA$l$ is inverted as a signal $\overline{TA}$ and also is one-digit time delayed via a flip flop $F_1$ as a signal TB. These signals TA and TB are entered into the micro instruction generator MC which in turn produces signals of predetermined waveforms. To sum up, the respective signals obtained by combinations of the contents of the Z register and the arithmetic instructions $I_{i+1} - I_{i+3}$ are transmitted to the common terminal TA$l$ and subsequently entered as the signals TA and TB into the generator MC. It leads to the generation of the signals XA of the desired waveforms. These select signals XA are illustrated in FIG. 4.

Likewise, for fourteen digit calculator application the signal B is produced. When $I_{i+1} - I_{i+3}$ are "000", the line $l_2$ is selected to produce the least significant digit timing signal $T_2'$ for fourteen digit utilization. If $I_{i+1} - I_{i+3}$ are "110", the fourteen digit word time pulse $[T_2 - T_{18}]'$ is developed. For twelve digit application the signals $T_4'$ and $[T_4 - T_{18}]'$ are produced.

Under the conditions that $I_{i+1} - I_{0+3}$ assume "111", "001", "010", "011", "101" or "100", the signals FCS are produced of which the waveforms do not vary despite any choice of the digit capacity. In the given example, a negative logic system is employed.

As noted earlier, in accordance with the present invention, the effective digit capacity of the LSI is altered by varying the pulse width of the word time pulse (its pulse cycling rate is not varied). In other words, since the storage capacity of the register X is not varied from the viewpoint of hardware, the one-word time period is always fixed but the width of the pulse designating its effective digit capacity is altered optionally. In addition, pursuant to the concept of the present invention, increase or decrease in the digit capacity of the register X is controlled with the least significant digit $X_0$ first, thereby to facilitate controlling in association with the decimal point or sign. That is to say, in the event that control for the digit capacity is carried out beginning with the upper digit positions, there is created the possibility that arithmetic operations should be stopped at any points in time during one-word time and this should be compatible with the conventional micro instruction controlling system.

The reason why the digit capacity of the register X is effectively varied by varying the pulse width of the word time signal is as follows.

For sixteen digit application, no problem is experienced since the full length of the register X is completely employed. For fourteen digit application, the word time signal has the altered pulse width $T_2 - T_{18}$. In this case, the digit times $T_0$ and $T_1$ are invalid for data entry, arithmetic operation, etc. That is, when the register X is recirculated and held via the AND gate $A_4$ during one word time period, the contents of the register X are shifted but not circulated at the digit times $T_0$ and $T_1$ because of the gate $A_4$ in its off state. However, at the time $T_2$ the gate $A_4$ is turned on and the contents of $X_2$ is outputted via $X_0$ such that circulation of the contents of $X_2 - X_5$ is substantially effected. This implies that the effective digit capacity of the register X is two-digit reduced.

As stated above in accordance with the present invention, the inputs to the external terminals of the LSI control the pulse width of the word time pulse defining the effective digit capacity of the register X and thus alter the effective capacity of the register X. As a consequence, calculators having different digit capacity but same specification can be implemented on the same LSI chip. It will be noted that a range of selectable digit capacity can be enlarged by additional increase of the external terminals $NC_1$, $NC_2$, etc.

Figure 3:
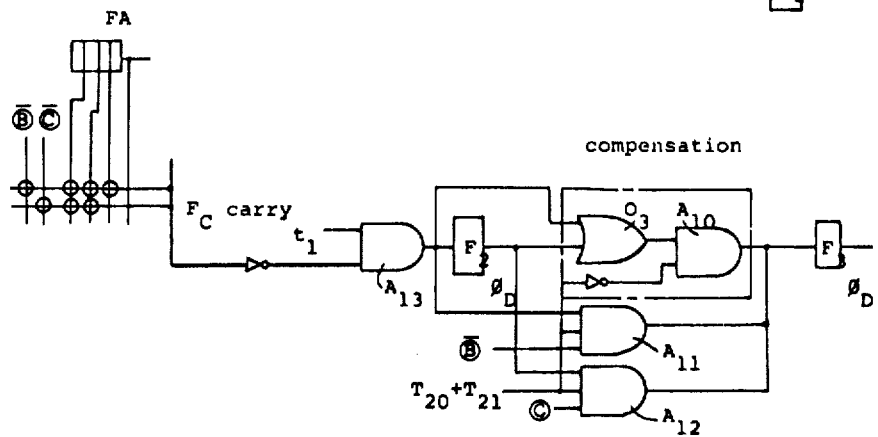
FIG. 3 is a block diagram of a compensation circuit for decimal point control associated with the present invention.

FIG. 3 illustrates control for decimal point processing associated with the above discussed digit capacity selection. This compensation circuit includes a $+6$ compensation circuit for binary-decimal number system which comprises an AND gate $A_{10}$ and an OR gate $O_3$, a $+2$ compensation circuit for binary-quaddecimal number system in the decimal point counter $x_1$, $x_2$ for fourteen digit application which comprises an AND gate $A_{11}$ and $a + 4$ compensation circuit for binary-duodecimal number system in the decimal point counter $x_1$, $x_2$ for twelve digit application which comprises an AND gate $A_{12}$. Since in the given example the decimal point register consists of two digits or eight bits, the above compensation circuits are needed. Thus, in the binary number system these compensation circuits are not required.

In FIG. 4, $T_0'$, $T_2'$ and $T_4'$ represent the least significant digit timing signals for sixteen digit, fourteen digit and twelve digit applications and $[T_0 - T_{21}]'$ has the one-word length designating the full digit capacity of the register X. $T_{16}'$, $T_{17}'$, $T_{18}'$ and $T_{20}'$ designate the most significant digit timing signal for numeral information storage, the timing signal for overflow determinations, the decimal point first bit timing signals and the most significant digit timing signal for the register X, respectively.

While a certain representative embodiment and details have been shown for the purpose of illustrating the invention, it will be apparent to those skilled in this art that various changes and modifications may be made without departing from the spirit or scope of the invention.

What is claimed is:

1. An integrated circuit comprising:

a numerical register for storage of numeral information;

means for generating word time signals designating the effective digit capacity of the register in response to predetermined digit capacity codes; and an external terminal means provided on said integrated circuit for receiving external signals determinative of a given digit capacity;

digit capacity code generating means interconnected between said terminal and said word time signal generator for encoding said external signals into said predetermined digit capacity codes and applying said codes to said word time signal generating means;

said word time signal generating means providing a word time signal of a variable pulse width determinative of a desired digit capacity; and control logic means interconnected with said numerical register and said word time generator and responsive to said variable pulse width word time signal to vary the digit capacity of said register.

2. An integrated circuit as set forth in claim 1 wherein said control logic means, in response to the thus altered word time signals selectively varies the said digit capacity of said register commencing with the respective least significant digit positions.

3. An integrated circuit as set forth in claim 2 wherein said word time signal generating means further includes timing signal generating means responsive to the application of the said external signals to the external terminal means to produce corresponding least significant digit timing signals together with said alterations in the pulse width word time signal.

4. An integrated circuit as set forth in claim 1 further comprises a decimal point register for storage of decimal point information associated with the numeral information in said numerical register, the digit capacity of the decimal point register being altered concurrently with the alterations in the effective digit capacity of said numerical register.

5. An integrated circuit as set forth in claim 1 further comprising gate means provided at a circulating path for the said numerical register and being responsive to the said altered pulse width word time signals.

6. An integrated circuit as set forth in claim 1 wherein said external terminal means comprises two or more external terminals for receiving combinations of a plurality of external inputs applied thereto determining the desired pulse width of the word time signal as a function of said combination of applied external inputs.

* * * * *